United States Patent [19]

Yamakage

[11] 4,451,185
[45] May 29, 1984

[54] BORING TOOL HOLDER WITH PROBES FOR MEASURING BORE

[75] Inventor: Tetsuro Yamakage, Anjo, Japan

[73] Assignee: Toyoda Koki Kabushiki Kaisha, Kariya, Japan

[21] Appl. No.: 333,057

[22] Filed: Dec. 21, 1981

[30] Foreign Application Priority Data

Dec. 27, 1980 [JP] Japan .................. 55-185048

[51] Int. Cl.³ ............................................. B27C 9/02
[52] U.S. Cl. ...................................... 408/2; 408/158; 408/180; 408/12; 364/474
[58] Field of Search ................... 408/3, 10, 11, 12, 13, 408/168, 147, 149, 158, 159, 173, 180, 178, 2; 364/474; 318/571; 409/204; 33/178 E; 82/2 E

[56] References Cited

U.S. PATENT DOCUMENTS

| | | | |
|---|---|---|---|
| 3,279,285 | 10/1966 | Ivins | 408/13 |
| 3,341,947 | 9/1967 | Berryman | 33/178 E |
| 3,492,894 | 2/1970 | Hahn et al. | 408/13 |
| 3,715,167 | 2/1973 | Ollearo | 408/149 |
| 3,958,338 | 5/1976 | Anichini et al. | 33/178 E |
| 3,966,347 | 6/1976 | Watson | 408/147 |
| 4,066,380 | 1/1978 | Beck et al. | 408/173 |
| 4,281,385 | 7/1981 | Nakaso et al. | 364/474 |

FOREIGN PATENT DOCUMENTS 54-85492 7/1979 Japan.

*Primary Examiner*—Z. R. Bilinsky
*Assistant Examiner*—Thomas M. Kline
*Attorney, Agent, or Firm*—Oblon, Fisher, Spivak, McClelland & Maier

[57] ABSTRACT

A tool holder having a shank receivable in a machine tool spindle, a tool mounting shell securely connected to the shank and adjustably movably carrying a cutting tool in a radial direction thereof, and a pair of contact detection members respectively protruded from the outer surface of the mounting shell in opposite directions. The tool holder, when used while received in the machine tool spindle, operates not only to make a bore in a workpiece, but also to be a measuring probe in measuring the diameter of the bore so that a machine tool using the tool holder is able to successively perform boring and measuring operations of the bore. Further, the tool holder incorporates a tool position adjusting mechanism therein.

9 Claims, 6 Drawing Figures

FIG. I

BORING TOOL HOLDER WITH PROBES FOR MEASURING BORE

BACKGROUND OF THE INVENTION

1. Field of the Invention

The present invention relates in general to a tool holder suitable for use on a machine tool, preferably, having an automatic tool changer. More particularly, it relates to such a tool holder provided, in addition to a tool position adjusting mechanism, with a pair of probes for measuring bores.

2. Description of the Prior Art

In a conventional machine tool, in order to measure a machined bore of a workpiece mounted on the machine tool, a measuring device provided with a displaceable feeler and a displacement detector, such as a differential transformer, for detecting a displacement amount of the feeler, is inserted into a tool spindle of the machine tool to be moved into engagement with the machined bore. In order to output the measured signal, the measuring device is also provided with conductors which are connected through a connector to an external control circuit. Accordingly, such a measuring device cannot be formed integrally with a boring tool which is rotated for boring operations. As a consequence, in order to measure the machined bore, the measuring device has to be inserted into the tool spindle through the aid of an automatic tool change device, and this disadvantageously results in substantial time consumption for measuring the machined bore.

SUMMARY OF THE INVENTION

It is therefore an object of the present invention to provide an improved tool holder which, when received in a machine tool spindle, operates not only to make a bore in a workpiece, but also to form a measuring probe in measuring the machine bore, thus enabling a machine tool to perform a boring operation and a measuring operation in succession.

Another object of the present invention is to provide an improved tool holder of the character set forth above which is capable of effecting a boring operation approximately up to a bottom portion of a blind hole.

Briefly, according to the present invention, there is provided a tool holder for use in a machine tool system which is capable of electrically detecting the contact between a cutting tool on the tool holder received in a machine tool spindle and a workpiece and which is also capable of measuring the diameter of a machined bore of the workpiece by detecting the amounts of relative movements which are effected between the tool spindle and the workpiece until such contact is detected. The tool holder comprises a shank receivable in the tool spindle, a tool mounting shell securedly connected to the shank and carrying the cutting tool thereon, and a pair of contact detection members respectively protruded from the outer surface of the mounting shell in opposite directions. The detection members are formed at their respective outer ends with contact points, each on a line which is perpendicular to a first plane and which is parallel to, and spaced from, a second plane by a predetermined distance in the directional sense of the cutting tool. The first plane encompasses the axis of the mounting shell and passes through the vicinity of a cutting edge of the cutting tool. The second plane intersects at right angles with the first plane on the axis of the mounting shell. Further, the space between the contact points is choosen to be greater than the width in the second plane of the mounting shell.

When using the tool holder, it is possible to measure the diameter of a bore by effecting relative movement between a machine tool spindle receiving the tool holder and a workpiece until each of the contact detection members comes into contact with the internal surface of the bore after the machining operation of the bore while counting the amount of such relative movement. Accordingly, the successive performance of a boring operation and a measuring operation can be realized by the use of the tool holder since they are performed with the tool holder being received in the same tool spindle.

In another aspect of the present invention, the pair of contact detection members are located behind the cutting edge of the cutting tool in an axial direction of the mounting shell. This advantageously permits the cutting edge to go near a bottom portion of a blind hole so that approximately the entire length of the blind bore can be machined.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
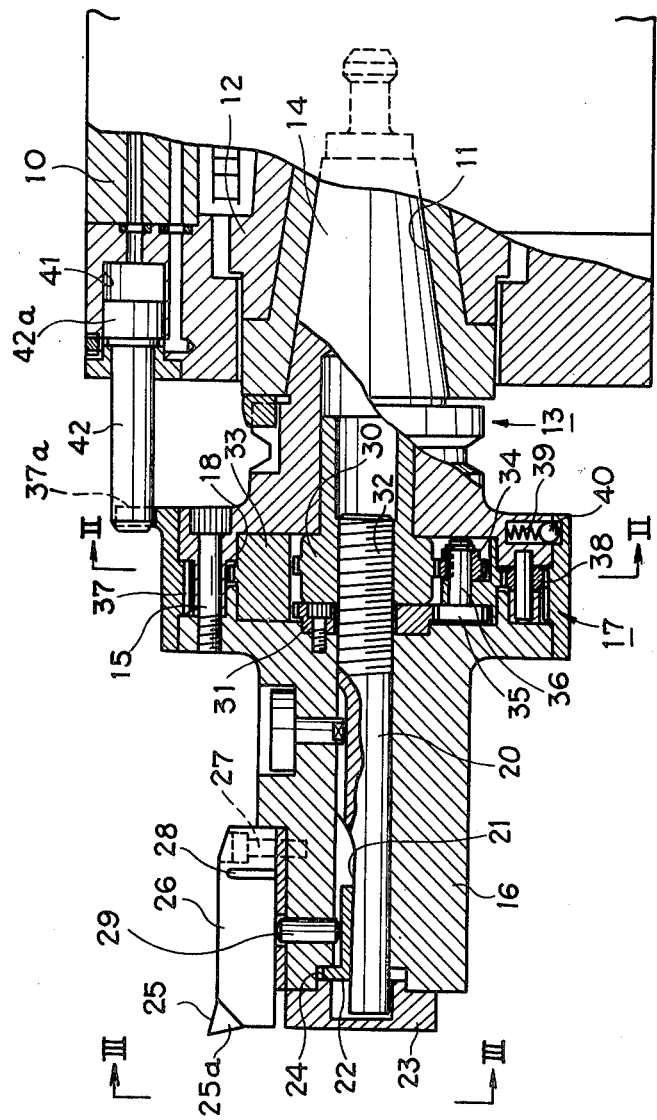
FIG. 1 is a sectional view of a tool holder according to the present invention.
Figure 2:
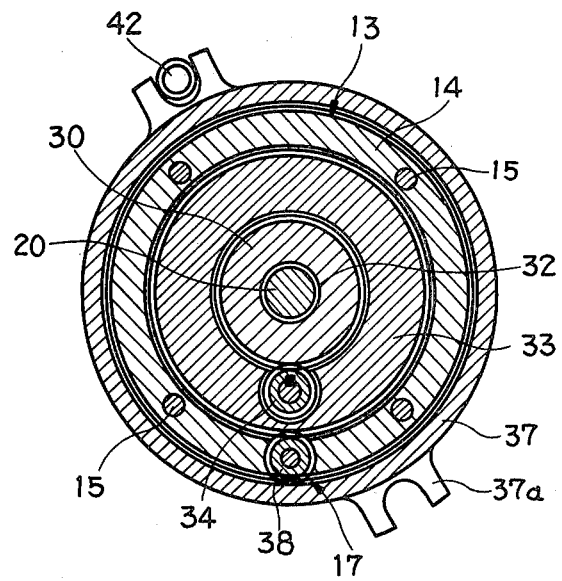
FIG. 2 is a sectional view taken along the line II—II in FIG. 1.

Referring now to the drawings, and more particularly to FIGS. 1 and 2, there is shown a spindle head 10 of a numerically controlled machine tool with an automatic tool change function. A tool spindle 12, having a tapered bore 11 at its front end, is rotatably supported in spindle head 10. Tool spindle 12 is rotated by a drive motor and is stopped at a predetermined angular position during tool change operation. Furthermore, every rotation of the tool spindle 12 is detected by a proximity switch (not shown) during tool position compensating operation. It is to be noted here that the machine tool has a function of measuring a machined bore by utilizing a contact detecting device, which is described hereinafter.

Reference numeral 13 denotes a tool holder to be used in the machine tool and incorporating a tool position compensating mechanism. Tool holder 13 includes a shank 14 to be inserted into tapered bore 11 of spindle 12 and a cylindrical tool mounting shell 16 secured to shank 14 in co-axial alignment therewith through bolts 15. A recess 18 is formed at a contact portion between shank 14 and shell 16 to receive a reduction gear mechanism 17, which is described hereinbelow.

A screw shaft 20 is non-rotatably but axially slidably received within shell 16 in co-axial relationship therewith. Screw shaft 20 is formed at the front end thereof with a cam surface 21 which is sloped to ascend as it goes toward the front end of screw shaft 20. A slide piece 22 is slidably engaged on cam surface 21 and is received in a groove 24, formed between shell 16 and an end cap 23 secured to the front end of shell 16 in such a manner as to be movable only in a radial direction. Shell 16 is formed at its external front portion with a tool mounting seat, on which one end of a cutting tool 26 having a cutting blade 25 at its other end is fixed by means of a bolt 27. Cutting tool 26 is formed at its mid portion with a slot 28 to facilitate outward flexing or bending of cutting blade 25. A pin 29 extends through mounting shell 16 in a radial direction thereof, and engages at one end thereof with slide piece 22 and at an opposite end thereof with the back of cutting blade 25 of cutting tool 26. Accordingly, when screw shaft 20 is moved in the axial direction, slide piece 22 is moved in the radial direction through a wedging action of cam surface 21, whereby cutting tool 26 is flexed or bent in the radial direction through pin 29 to adjust the position of cutting blade 25. The front end surface of the cutting tool 26 is within the same plane as the front end surface of the end cap 23, and the cutting blade 25 is protruded from the plane.

The gear reduction mechanism 17 has the following construction. Within recess 18 formed at the contact portion between shank 14 and shell 16, a rotary gear 30 rotatably supported by shank 14 and a stationary gear 31 secured to shell 16 are received in juxtaposed relationship and in coaxial alignment with the axis of shank 14. Rotary gear 30 is threadably engaged with a thread portion 32 formed at the rear end of screw shaft 20. Within recess 18, there is also received a ring-shaped transmission gear 33 which is rotatable about the axis of tool holder 13 and encloses rotary gear 30 and stationary gear 31. Transmission gear 33 rotatably supports a shaft 36 on which are secured a pair of pinion gears 34 and 35 engaged with rotary gear 30 and stationary gear 31, respectively. It is noted here that the number of teeth of stationary gear 31 and pinion 35 are respectively set to be (N5−1) and (N6+1), where N5 and N6 are tooth numbers of rotary gear 30 and pinion 34, respectively. Accordingly, a reduction gear ratio of rotary gear 30 to transmission gear 33 is made larger.

A ring-shaped internal gear 37 is rotatably supported on external peripheries of shank 14 and shell 16. Rotatably supported by shank 14 is a planet gear 38 which is engaged with both of internal gear 37 and transmission gear 33. Internal gear 37 is formed with a V-shaped groove into which a steel ball 40 is disposed by means of a compression spring 39 disposed between shank 14 and ball 40. Accordingly, internal gear 37 is normally prevented from rotation relative to shank 14 and shell 16 during cutting operations.

As shown in FIG. 2, internal gear 37 has formed on its external periphery a pair of forked members 37a, one of which is engageable with a piston rod 42 of a piston 42a slidably received in a cylinder 41 formed in spindle head 10. When piston rod 42 is engaged with forked member 37a during the tool position compensating operation, internal gear 37 is fixed relative to spindle head 10 and relative rotation is allowed between internal gear 37 and shank 14.

Figure 3:
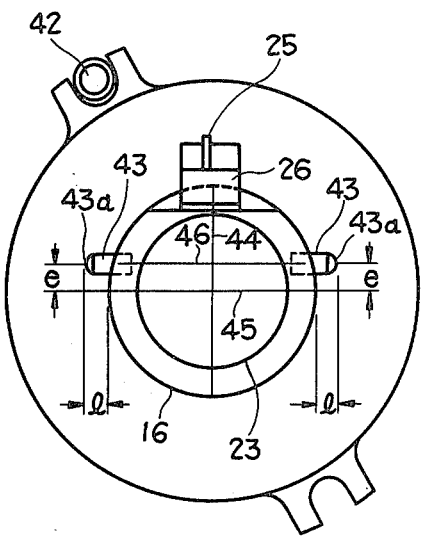
FIG. 3 is a front view of the tool holder as viewed along the line III—III in FIG. 1.

Furthermore, behind the cutting blade 25 in the axial direction of the shell 16, a pair of contact detecting probes or pins 43 are protruded from the outer surface of the shell 16 as shown in FIG. 3. The axes of the pins 43 extend on a line 46 which is perpendicular to a first plane 44 and which is parallel to, and spaced from, a second plane 45 by a predetermined distance (e) in the direction towards cutting tool 26. The first plane 44 encompasses the axis of the shell 16 and passes through the vicinity of the cutting edge 25a of the blade 25. The second plane 45 intersects approximately at right angles with the first plane 44 on the axis of the shell 16. The pins 43 are formed at their outer ends with contact points 43a, each of which is protruded by a length (l) beyond the outer surface of the shell 16 in the direction of the second plane 45.

The tool position compensating operation of the boring tool holder 13 as constructed above will now be described. First of all, the tool holder 13 is inserted by the automatic tool change device into tapered bore 11 of tool spindle 12 having been stopped at a predetermined angular position. Cylinder 41 is actuated to advance piston rod 42 into engagement with forked member 37a of internal gear 37 to thereby fix internal gear 37 relative to spindle head 10. Under these conditions, spindle 12 together with tool holder 13, are rotated by the drive motor at a low speed. When tool holder 13 is rotated relative to internal gear 37, transmission gear 33 is rotated relative to tool holder 13 through planet gear 38 in the same direction as tool holder 13. Rotation of transmission gear 33 causes the pinion gear 35 to rotate about stationary gear 31, whereby rotary gear 30 is rotated relative to tool holder 13 through pinion 34.

Assuming that the tooth numbers of internal gear 37, transmission gear 33, stationary gear 31, pinion gear 35, rotary gear 30 and pinion gear 34 are designated as N1, N2, N3, N4, N5 and N6, respectively, the rotational amount $\theta$ of the rotary gear 30 per single rotation of the spindle 12 is represented as follows:

$$\theta = N1/N2 \, (N3 \cdot N6/N4 \cdot N5 - 1)$$

Accordingly, rotation of spindle 12 is transmitted to rotary gear 30 with a large reduction gear ratio.

Rotation of rotary gear 30 relative to tool holder 13 causes screw shaft 20 to move in the rightward direction, as viewed in FIG. 1, whereby slide piece 22 is moved radially outwardly through the wedging action of the cam surface 21. Radial movement of slide piece 22 is transmitted through pin 29 to cutting tool 26 to thereby adjust the position of cutting blade 25 in the radial direction. In this manner, the radial position of cutting blade 25 of cutting tool 26 is adjusted through a unit amount per single rotation of the spindle 12.

Figure 4:
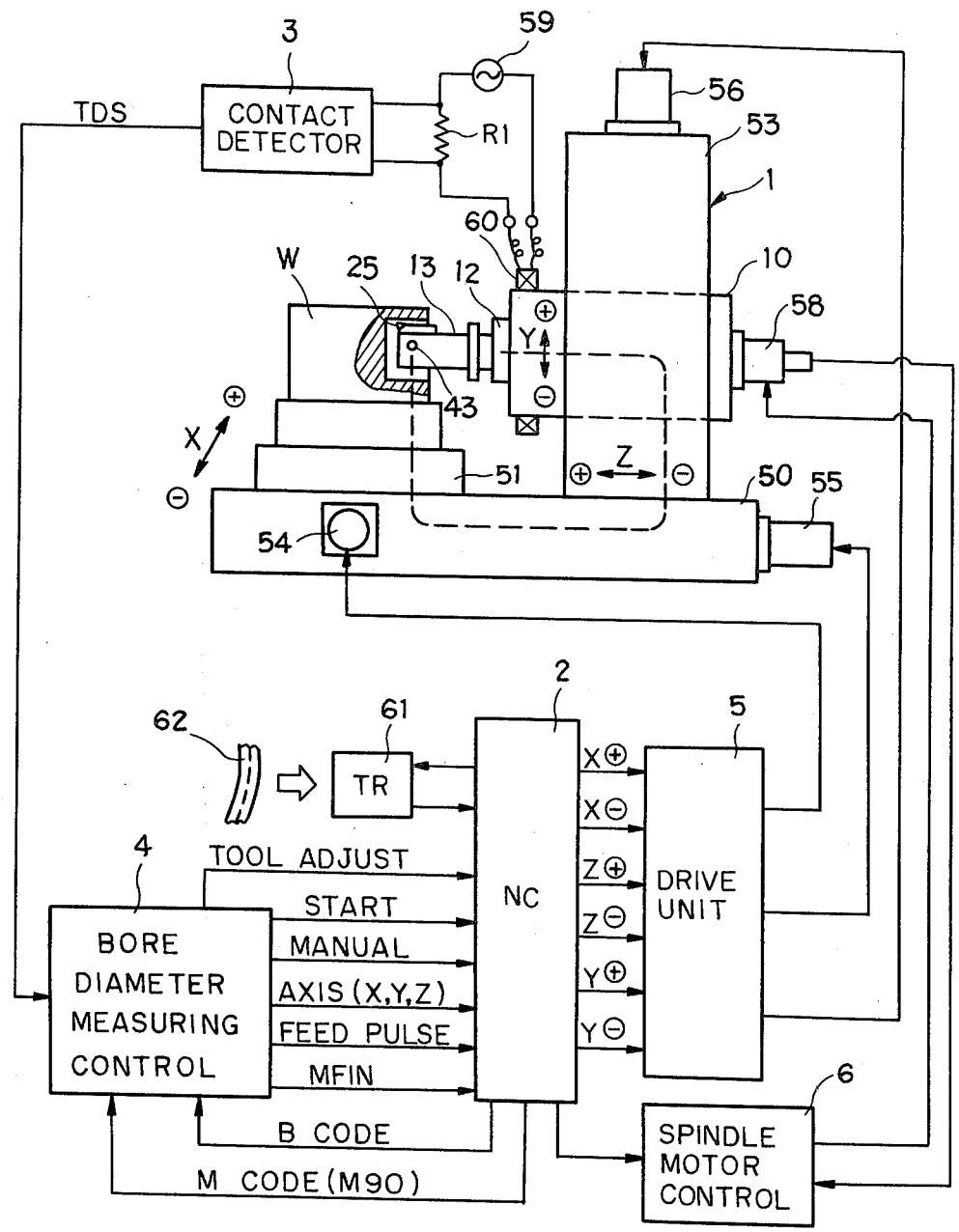
FIG. 4 is a schematic illustration of a machine tool with a bore diameter measuring apparatus for measuring a machined bore.

Construction of the machine tool with a bore diameter measuring function is described hereunder with reference to FIG. 4. The machine tool includes a machine body 1, a numerical control device 2, a contact detecting circuit 3 and a control device 4 for measurement of a machined bore.

Reference numeral 50 indicates a bed of machine body 1, on which a work table 51 for mounting a workpiece W is mounted for sliding movement in a horizontal X-axis direction perpendicular to the plane of the drawing sheet. A column 53 is mounted on bed 50 for sliding movement in a horizontal Z-axis direction orthogonal to the X-axis direction. Spindle head 10 is, in turn, mounted on column 53 for sliding movement in a vertical Y-axis direction. Work table 51 is drivingly connected to a servomotor 54 secured to bed 50 to be moved in the X-axis direction. Column 53 is drivingly connected to a servomotor 55 secured to bed 50 to be moved in the Z-axis direction. Spindle head 10 is drivingly connected to a servomotor 56 mounted on the top of column 53 to be moved in the Y-axis direction. Servomotors 54, 55 and 56 are connected to numerical control device 2 through a drive unit 5 to be rotated by distribution feed pulses generated from numerical control device 2.

Tool spindle 12 is drivingly connected to a drive motor 58 secured to spindle head 10 to be rotated thereby and adapted to receive the above-described tool holder 13 by means of the automatic tool change device (not shown). Drive motor 58 is controlled by a spindle motor control circuit 6 connected to numerical control device 2. A toroidal coil 60 is mounted on the front end of spindle head 10 and is connected to an AC power source 59 through a detection resistance R1. Coil 60 is wound around iron core which surrounds spindle 12.

When the contact point 43a of either of the contact detecting pins 43 is brought into contact with machined bore of workpiece W, an induced current is produced in a circuit loop including workpiece W, work table 51, bed 50, column 53, spindle head 10, tool spindle 12, and tool holder 13, as shown in dotted lines in FIG. 4, whereby an exciting current in coil 60 is increased. This causes the voltage across resistance R1 to be increased. Contact detecting circuit 3 detects the contact between workpiece W and either of the contact detecting pins 43 by detecting increased voltage across resistance R1. When detecting the contact, contact detecting circuit 3 generates a contact detecting signal TDS.

Numerical control device 2 is of a conventional construction and has a usual numerical control function in accordance with numerical control information, which is recorded on a punched tape 62 readable by a tape reader 61. Furthermore, numerical control device 2 serve to control movement of spindle head 10 in accordance with command signals output from a bore diameter measurement control device 4, which is described hereinafter. The numerical control information includes M-code data M90 for commanding a bore diameter measuring operation and B-code date for instructing a finished diameter of the bore of the workpiece W. These code data are applied from numerical control device 2 to bore diameter measurement control device 4 in the course of the numerical control operation.

Bore diameter measurement control device 4 in this embodiment is constructed by a commercially available general purpose microcomputer which is programmed to control the bore diameter measuring operation by switching numerical control device 2 into a manual mode and applying an axis designation data and a pulse distribution command to numerical control device 2 in response to M-code data M90.

Figure 5:
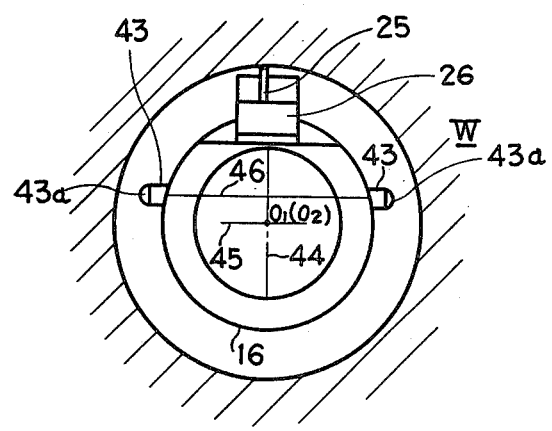
FIGS. 5 and 6 are illustrative of a method of measuring the diameter of the machined bore.
Figure 6:
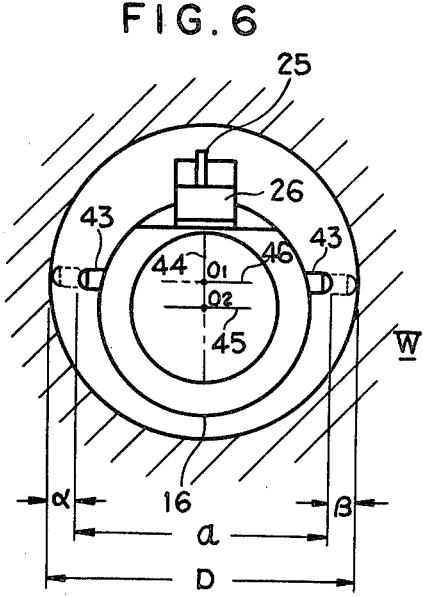

The manner of measuring a diameter of the machined bore on workpiece W is illustrated in FIGS. 5 and 6.

Upon completion of boring operation with the tool holder 13, the tool spindle 12 is stopped at the predetermined angular position where the aforementioned first plane 44 of the tool holder 13 is placed in parallel relation with the vertical Y-axis, that is, the direction of movement of the spindle head 10. In this situation, the axis $O_1$ to be mesured of the machined bore of the workpiece $\overline{W}0$ is in co-axial alignment with the axis O2 of the tool holder 13 or the shell 16, as shown in FIG. 5. The axis 46 of the contact detection pins 43 is then brought into transverse alignment with the axis O1 of the machined bore by moving the spindle head 10, and therefore the tool holder 13, downwardly along the vertical Y-axis through the aforementioned predetermined distance (e). As the axis 46 of the detection pins 43 intersects the axis O1 of the machined bore at right angles, the diameter D of the machined bore can be obtained by making the calculation $D = a + \alpha + \beta$, where:

a ... known distance between the ends of the detection pins; and $\alpha$ and $\beta$ ... distances between the internal surfaces of the bore and the pins.

For the purpose of this calculation, a horizontal X-axis movement of the work table 51 is first made toward the left until one of the detection pins 43 comes into contact with the internal surface of the machined bore, and then toward the right until the other detection pin 43 comes into contact with the internal surface of the machined bore. The numbers of pulses which are applied to the drive unit 5 during such leftward and rightward movements of the work table 51 are counted, whereby the distances $\alpha$ and $\beta$ are obtained. The diameter measuring control device 4 subsequently calculates the diameter D of the machined bore based upon the distances a, $\alpha$ and $\beta$. The control device 4 also calculates a tool position compensating amount ($\epsilon$) by taking half of the difference between a reference diameter (a desired finish diameter) Do applied thereto in the form of the B-code and the measured diameter D. The diameter measuring control device 4 is programmed to effect the aforementioned movements of the spindle head 12 and the work table 51.

Furthermore, in this particular embodiment a trial cutting operation may be carried out with the tool holder 13 whose tool position has been set to make a bore smaller in diameter than the reference bore. In this trial cutting operation, the measuring control device 4 may also be provided with a function which divides the compensating amount ($\epsilon$) by a unit compensating amount ($\Delta\chi$) per rotation of the tool spindle 12. This function results in obtaining the number (n) of rotations through which the tool spindle 12 is to be rotated for tool position compensation. Accordingly, with cylinder 41 being actuated to fix internal gear 37 relative to spindle head 10, spindle 12 is rotated through n revolutions in one direction, whereby the tool position is adjusted to a position corresponding to diameter Do of the finish bore. When the piston of cylinder 41 is retracted to release internal gear 37, a finish machining operation can be immediately initiated. Rotation of spindle 12 in the reverse direction enables tool position compensation in the opposite direction.

Another compensating method for tool position may be applicable in which there are preset a number of allowance ranges for the sum of reference distances $\alpha o$ and $\beta o$ through which leftward and rightward movements of the tool holder 13 is to be effected in the measuring operation of a bore machined to the reference or desired finish diameter Do. In this method, the difference between the sum of the reference distances $\alpha o$ and $\beta o$ and the sum of actually measured distances $\alpha$ and $\beta$ is calculated to check which allowance range the difference belongs to, and the tool position is then compensated by an appropriate one of the compensation amounts which are chosen respectively in correspondence to the number of the allowance ranges. This compensation method is suitable for use in the case where a finish boring is directly carried out without any trial cutting and where a finished bore is measured to judge which allowance range it belongs to so that tool position compensation is made based upon such judgement.

In the case where a trial cutting, a bore measurement and a tool position compensation are carried out, the bore measurement may be performed again after a finish cutting, so as to judge whether the finished bore is allowable or not. In addition to this, the tool position compensation may be followed by a further bore measurement if need be. Furthermore, after a finish cutting which follows a bore measurement and a tool position compensation, the cutting tool 26 may be withdrawn radially inward of the shell 16 by a predetermined amount or a previous compensation amount, whereby it is possible to make a smaller bore than the reference or desired finish bore in a subsequent trial cutting.

The tool holder 13 according to the present invention is provided with a pair of contact detection points 43a which are protruded from the outer surfaces of the shell 16, but such detection points need not be formed on pins. Further, as long as the distance between the detection points 43a is precisely choosen, the protruding amounts of these points from the outer surface of the shell 16 are not required to be identical. The detection points 43a may be within different planes that intersect the axis of the shell 16 at right angles. However, the protruding amount of any of the detection points 43a from the outer surface of the shell 16 must be smaller than that of the cutting edge 25a of the tool 26. Moreover, the present invention is not limited to a tool holder wherein the protruding amount of the cutting edge 25a from the outer surface of the shell 16 is adjustable as in the foregoing embodiment, but it is rather applicable also to tool holders of the type which is not arranged for adjustment of the tool position.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A tool holder for use in a machine tool system including contact detection circuit means for detecting contact between said tool holder received in a tool spindle and a bore of a workpiece mounted on a work table when relative movement between said tool spindle and said work table is effected in a direction perpendicular to the axis of said tool spindle so as to measure the diameter of said bore after the machining of said bore, said tool holder comprising:

a shank receivable in said tool spindle;

a tool mounting shell fixed to said shank and including means for carrying a cutting tool thereon;

a pair of contact detection members respectively protruding from the outer surface of said tool mounting shell in opposite directional senses;

a first plane encompassing the axis of said tool mounting shell and a cutting edge of said cutting tool;

a second plane encompassing the axis of said tool mounting shell at right angles to said first plane; and contact points formed at opposite ends of said contact detection members, each of said contact points being defined on a line extending perpendicular to said first plane and parallel to said second plane, said line being spaced from said second plane by a first predetermined distance in the directional sense toward said cutting tool, said contact points being spaced from one another by a second predetermined distance which is greater than the width of said tool mounting shell in the direction of said second plane.

2. A tool holder as set forth in claim 1, wherein said pair of contact detection members are spaced toward said spindle relative to said cutting edge in said axial direction of said tool mounting shell.

3. A tool holder as set forth in claim 2, wherein both of said contact detection members extend on said line prependicular to said first plane and spaced parallely from said second plane.

4. A tool holder as set forth in claim 3, wherein said contact points of said contact detection members are equidistant from said first plane.

5. A tool holder as set forth in claim 1 or 4, wherein said cutting tool is adjustably movable in a radial direction of said tool mounting shell, further comprising:

a screw shaft axially slidably but non-rotatably supported in said tool mounting shell and having a cam surface which is sloped along the axis of said tool mounting shell;

transmitting means interposed between said cutting tool and said cam surface of said screw shaft for adjustably moving said cutting tool in the radial direction by wedging action of said cam surface upon axial movement of said screw shaft;

a rotary member rotatably received and threadedly engaged with said screw shaft;

a ring shaped internal gear member rotatably supported on the external peripheries of said shank and said mounting shell, said internal gear member being engageable with means for rotatably fixing said internal gear member relative to said spindle head for bringing about relative rotation between said internal gear member and said mounting shell upon rotation of said tool spindle; and reduction gear means for transmitting rotation of said mounting shell relative to said internal gear member to said rotary member at a predetermined reduction gear ratio, said reduction gear means further comprising a rotatable planet gear engaged with said internal gear member.

6. A tool holder as set forth in claim 5, wherein said transmitting means further comprises:

a slide piece maintained in contact with said cam surface of said screw shaft and guided to be moved in the radial direction of said mounting shell when said screw shaft is axially moved; and a pin guided by said tool mounting shell between said slide piece and said cutting tool for transmitting radial movement of said slide piece to said cutting tool.

7. A tool holder as set forth in claim 6, further comprising:

latch means provided between said internal gear member and one of said shank and mounting shell for preventing rotation of said internal gear member relative to said shank during cutting operation.

8. A tool holder as set forth in claim 7, wherein said rotary member and said reduction gear means are received in a recess formed at the contact portion between said shank and said mounting shell.

9. A tool holder as set forth in claim 8, said rotary member having a gear portion, wherein said reduction gear means further comprises:

a stationary gear secured to said mounting shell in juxtaposed and co-axial relationship with said rotary member;

a ring-shaped transmission gear enclosing said rotary member and said stationary gear and engaged at the external periphery thereof with said planet gear; and a pair of pinion gears rotatably supported by said transmission gear and engaged with said stationary gear and said gear portion of said rotary member.

* * * * *